United States Patent

McKee et al.

[15] 3,640,593
[45] Feb. 8, 1972

[54] DOUBLE ROW BEARING

[72] Inventors: Lewis W. McKee, Brookfield, Conn.; Robert H. Feest, Jr., Juno Beach, Fla.

[73] Assignee: The Borden Corporation, Danbury, Conn.

[22] Filed: Oct. 7, 1969

[21] Appl. No.: 867,429

[52] U.S. Cl. ..........................................308/196
[51] Int. Cl. ......................................F16c 33/60
[58] Field of Search ..................308/193, 196, 195

[56] References Cited

UNITED STATES PATENTS 1,340,250  5/1920  Pruyn .....................308/196
1,261,154  4/1918  Newmann ...............308/196

FOREIGN PATENTS OR APPLICATIONS 891,666  3/1962  Great Britain...................308/196

*Primary Examiner*—Martin P. Schwadron
*Assistant Examiner*—Frank Susko
*Attorney*—Shenier & O'Connor

[57] ABSTRACT

An improved double-row bearing in which two pairs of ball-receiving raceways comprise a first pair of deep groove-bearing raceways, one of which is formed in a unitary ring which also provides a raceway of the other pair, and the other of which is formed by two ring sections, one of which provides the other raceway of the other pair, the other pair and its rolling elements making up an angular-contact bearing.

6 Claims, 2 Drawing Figures

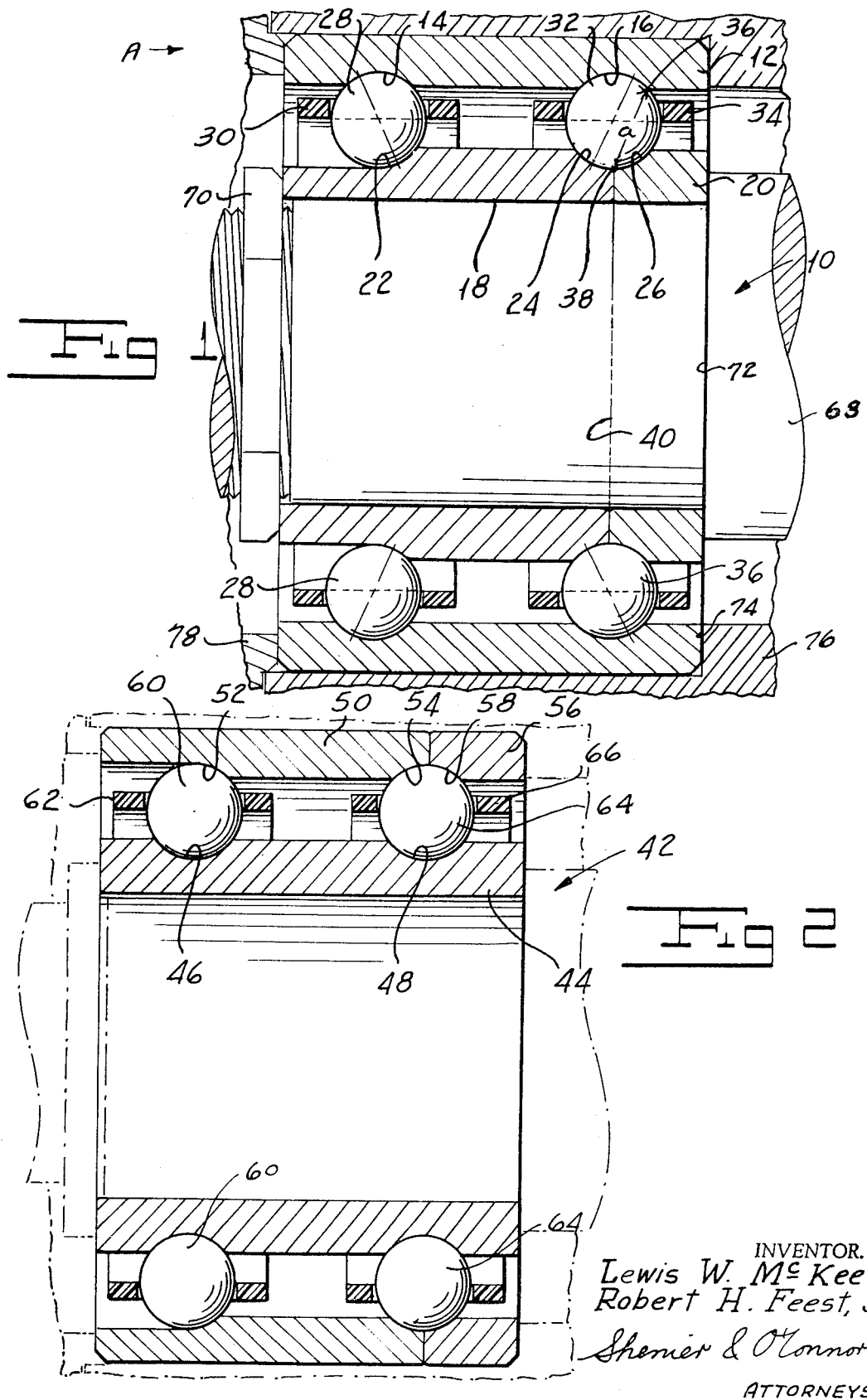

DOUBLE ROW BEARING

BACKGROUND OF THE INVENTION

The type of bearing which is selected for a particular installation is governed by the conditions existing at the installation. Where rigidity and high radial load capacity are required, either a double-row bearing or a pair of tandem mounted angular-contact bearings are used in the prior art. While both of these arrangements provide rigidity and high radial load capacity, each of them embodies a defect. The double-row bearing has the capability of absorbing some thrust in each direction, but the thrust capacity is relatively low. The tandem pair of bearings have high thrust capacity in one direction but no thrust capacity in the other direction. In addition, control of thrust sharing and end play is relatively difficult in installations of this type.

We have invented an improved double-row bearing which overcomes the defects of installations of the type discussed above. Our improved double-bearing not only provides rigidity and high radial load capacity but also has high thrust capacity in one direction and permits thrust reversals. It facilitates control over both thrust sharing and end play. Our construction permits the use of unitary cages in a double-row bearing. It is relatively simple in construction for the result achieved thereby.

SUMMARY OF THE INVENTION

One object of our invention is to provide an improved double-row bearing having high thrust capacity in one direction.

Another object of our invention is to provide an improved double-row bearing which accommodates thrust reversals.

A further object of our invention is to provide an improved double-row bearing which is relatively easy to assemble.

A further object of our invention is to provide an improved double-row bearing which facilitates control of thrust sharing.

Yet another object of our invention is to provide an improved double-row bearing which facilitates control of end play.

A still further object of our invention is to provide an improved double-row bearing which employs unitary ball separators.

Other and further objects of our invention will appear from the following description.

In general, our invention contemplates the provision of a double-row bearing comprising two pairs of raceways and two sets of balls disposed therein in which one pair of raceways are deep groove-bearing raceways, one of which is formed in a unitary member providing a raceway of the other pair, and the other of which is formed by two ring sections, one of which provides the other raceway of the other pair of raceways, which together with their rolling elements, make up an angular-contact bearing.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a sectional view of the preferred embodiment of our improved double-row bearing.

FIG. 2 is a sectional view of an alternate form of our improved double-row bearing.

DESCRIPTION OF THE PREFERRED EMBODIMENT

Referring now to FIG. 1 of the drawings, the preferred embodiment, indicated generally by the reference character 10 of our improved double-row bearing, comprises an outer bearing ring 12 having respective raceways 14 and 16 formed therein. Our bearing includes respective inner ring sections 18 and 20, the section 18 providing a raceway 22, the outer shoulder of which is removed. Section 18 also provides a raceway portion 24 which, when the bearing is assembled in a manner to be described, cooperates with a raceway portion 26 formed in section 20.

When the bearing is assembled in a manner to be described, raceways 14 and 22 cooperate to receive a plurality of balls 28 with which a retainer 30 may be associated. Similarly, raceway 16 and raceway portions 24 and 26 cooperate to receive a plurality of balls 32 with which a retaining ring 34 may be associated, thus to form an angular-contact bearing.

In assembling the bearing 10, we first assemble the outer ring 12 with the balls 28 and the cage 30 if a cage is required. The number of balls 28 provided is the maximum number consistent with good cage design. If no cage is needed, then the raceways 14 and 22 may be completely filled with balls. Next, the balls 32 and the cage 34, if one is provided, are assembled in raceway 16 and in raceway portion 24. By properly locating the outer edge 36 of raceway 16 and the edge 38 of raceway portion 24 as indicated by the distance $a$ in FIG. 1, the balls 32 with the cage 34 may be snapped into and retained in position. Next, the ring section 20 is assembled in position by any suitable means known to the art. This may, for example, be accomplished by the parts which mount the bearing in the installation in which it is used. For example, ring sections 18 and 20 may be assembled on a shaft 68 by a nut 70 threaded on the shaft so as to hold the ring against a shoulder 72 on the shaft. The outer ring 12 may be located in a recess 74 in a mounting member 76 and may be held therein by an annular retainer 78 secured to member 76 by any suitable means (not shown). It will be understood that if there is no requirement that the balls 32 be retained when ring section 20 is removed, the spacing $a$ may be increased to facilitate assembly. Alternative to spacing points 36 and 38 so as to retain the balls, it is possible to use a special retainer which will hold the balls in position. We control the thrust sharing between the two sets of balls by controlling the dimensions at the interface 40 of ring sections 18 and 20.

Referring to FIG. 2 in an alternate form of our bearing indicated generally by the reference character 42, we make the interior ring 44 unitary and form it with two deep groove-bearing raceways 46 and 48. The outer ring of this form of our bearing comprises a first section 50 providing a raceway 52, the outer shoulder of which has been cut away, and raceway portion 54. The other outer raceway section 56 provides the other portion 58 of a deep groove-bearing raceway when the sections 50 and 56 are assembled. When these parts are assembled in a manner analogous to that pointed out above in connection with FIG. 1, raceways 46 and 52 cooperate to receive balls 60 which may or may not be provided with a cage 62. Similarly, the raceway 48 and the raceway portions 54 and 58 cooperate to receive balls 64, which may or may not be provided with a cage 66.

In use of our improved double-row bearing, it is assembled at the installation at which it is to be used in the manner described above. When so installed, it provides rigidity and high radial load capacity. In addition, in response to thrust in the direction of the arrow A in the drawing, it has a high thrust capacity. This results from the sharing of the load by the two rows of balls 28 and 32. In response to thrust in the reversed direction, that will be taken up by the row of balls 32.

It will be seen that we have accomplished the objects of our invention. We have provided an improved double-row bearing which overcomes the defects of double-row bearings of the prior art. Our double-row bearing not only provides rigidity and high radial load capacity but also has high thrust capacity in one direction and can accommodate reversals of thrust. It permits the use of unitary cages. It facilitates control of thrust sharing and end-play structure. It is relatively easily assembled.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention.

It is, therefore, to be understood that our invention is not to be limited to the specific details shown and described.

Having thus described our invention, what we claim is:

1. A double-row bearing including in combination a first unitary bearing ring having spaced generally spherical full-groove raceways therein, a second bearing ring comprising a first section having a partial-groove raceway with its outer shoulder at least partially removed and having a portion of a generally spherical full-groove raceway, a second bearing ring second section having another portion of a generally spherical full-groove raceway, means for assembling said first ring and said second ring sections with said partial-groove raceway in cooperative relationship with one of said first ring raceways to form a first pair of raceways and with said raceway portions forming a full-groove raceway in cooperative relationship with the other first ring raceway to form a second pair of raceways, a first set of balls located in the raceways of the first pair to form an angular-contact bearing and a second set of balls located in the raceways of the second pair to form a deep-groove bearing.

2. A double-row bearing as in claim 1 in which said second ring first section forms the inner part of a full-groove raceway, said inner part having an outer edge, the cooperating full-groove raceway of the other pair having an outer edge spaced from the outer edge of the inner part by a distance slightly less than the diameter of a ball.

3. A double-groove bearing as in claim 1 in which said sections are assembled at an interface, said interface being located adjacent the bottom of said one full-groove raceway.

4. A double-row bearing as in claim 1 including respective unitary cages for said sets of balls.

5. A double-row bearing including in combination, a unitary outer bearing ring having spaced full-groove raceways therein, an inner bearing ring comprising a first section having a partial-groove raceway with its outer shoulder at least partially removed and having a portion of a full-groove raceway, a second inner ring section having another portion of a full-groove raceway, means for assembling said outer ring and said inner ring sections with said partial-groove raceway in cooperative relationship with one of said outer ring raceways to form a first pair of raceways and with said raceway portions forming a full-groove raceway in cooperative relationship with the other outer ring raceway to form a second pair of raceways, balls located in the raceways of the first pair to form an angular-contact bearing and a second set of balls located in the raceways of the second pair to form a deep-groove bearing.

6. A double-row bearing including in combination, a unitary inner ring having spaced full-groove raceways therein, an outer bearing ring comprising a first section having a partial-groove raceway with its outer shoulder at least partially removed and having a portion of a full-groove raceway, a second outer ring section having another portion of a full-groove raceway, means for assembling said inner ring and said outer ring sections to form two pairs of cooperating raceways, one of said pairs being made up of an inner ring raceway and said partial-groove outer ring raceway, the other pair being made up of the other inner ring raceway and a raceway formed by said raceway portions, a first set of balls in the raceways of the first pair to make up an angular-contact bearing, and a second set of balls located in the raceways of the second pair to form a deep-groove bearing.

* * * * *